US009779316B2

(12) United States Patent
Rao et al.

(10) Patent No.: US 9,779,316 B2
(45) Date of Patent: Oct. 3, 2017

(54) SCALABLE AND DISTRIBUTED BIOMETRIC PROCESSING

(71) Applicants: Manjuprakash R. Rao, Bangalore (IN); Surajit Borah, Bangalore (IN); Sreenath K. Ramanna, Bangalore (IN); Rambabu Chinta, Bangalore (IN)

(72) Inventors: Manjuprakash R. Rao, Bangalore (IN); Surajit Borah, Bangalore (IN); Sreenath K. Ramanna, Bangalore (IN); Rambabu Chinta, Bangalore (IN)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 39 days.

(21) Appl. No.: 14/933,712

(22) Filed: Nov. 5, 2015

(65) Prior Publication Data

US 2017/0091570 A1   Mar. 30, 2017

(30) Foreign Application Priority Data

Sep. 30, 2015 (IN) .......................... 3145/DEL/2015

(51) Int. Cl.
*G06K 9/00* (2006.01)
*G06K 9/62* (2006.01)

(52) U.S. Cl.
CPC ..... *G06K 9/00979* (2013.01); *G06K 9/00234* (2013.01); *G06K 9/00288* (2013.01); *G06K 9/6262* (2013.01)

(58) Field of Classification Search
CPC ... G06K 9/00; G06K 9/00221; G06K 9/00979
See application file for complete search history.

(56) References Cited

U.S. PATENT DOCUMENTS 7,257,273 B2   8/2007   Li et al.
8,824,750 B2   9/2014   Jankowski et al.

OTHER PUBLICATIONS

U.S. Appl. No. 14/634,428, filed Feb. 27, 2015 entitled "System and Method for Distributed Video Analysis," Westmacott, Ian Christopher and Carney, Steve—Inventors.

*Primary Examiner* — Duy M Dang
(74) *Attorney, Agent, or Firm* — Fox Rothschild LLP; Robert J. Sacco; Carol E. Thorstad-Forsyth

(57) ABSTRACT

Processing system and method for biometrics identification uses a plurality of biometrics capture devices and one or more network servers to provide cloud based biometric processing services. One or more gateway computers regulate data traffic as between the one or more servers and the biometric capture devices. The components of the system work cooperatively to reduce system bandwidth requirements and reduce a processing load upon various system components. The components are responsive to processing requests which dynamically selectively specify constituent steps in a biometric recognition process which are to be performed by each of the components.

21 Claims, 8 Drawing Sheets

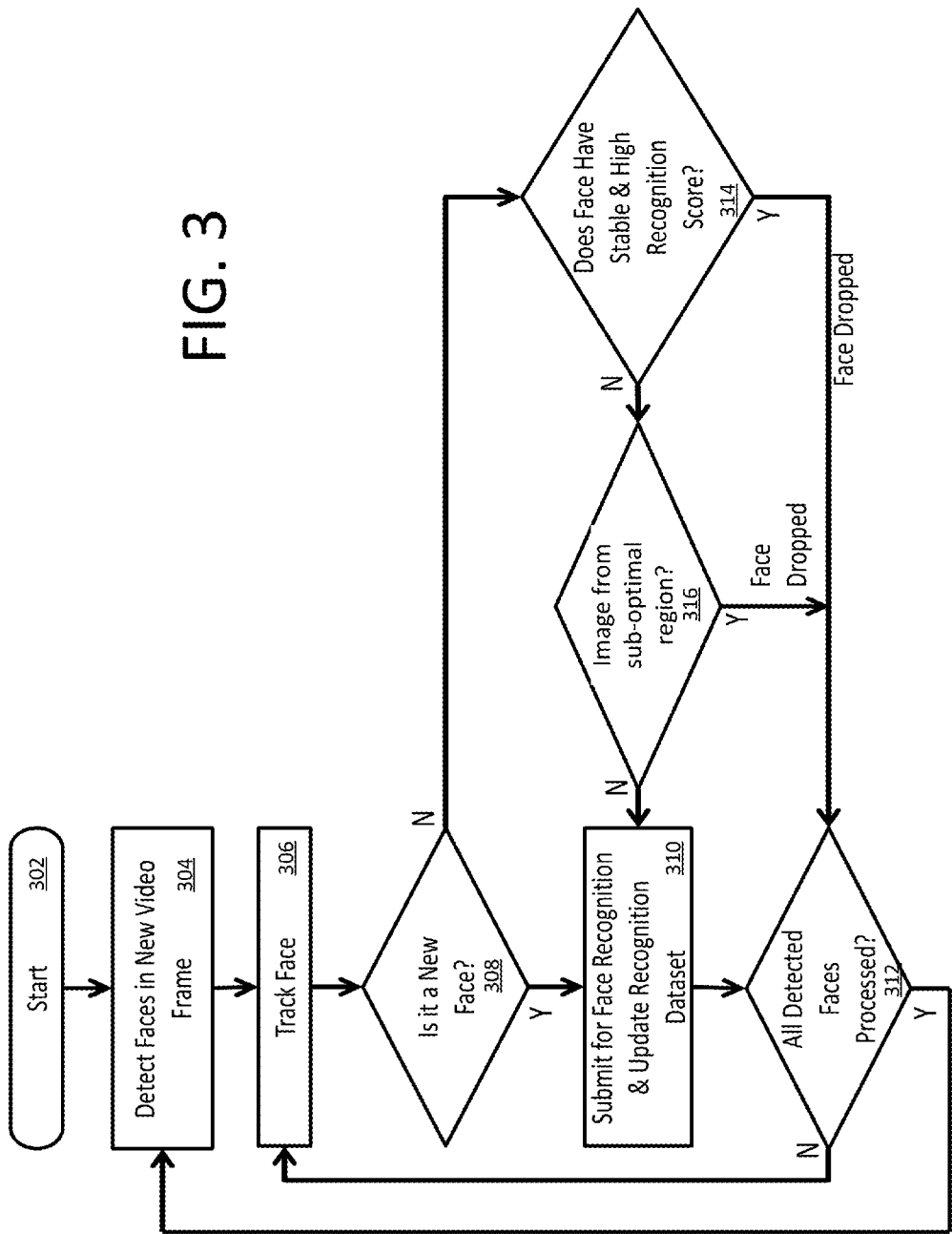

SCALABLE AND DISTRIBUTED BIOMETRIC PROCESSING

CROSS-REFERENCE TO PRIORITY APPLICATION

This application claims priority from Indian Patent Application No. 3145/DEL/2015 filed on Sep. 30, 2015.

BACKGROUND OF THE INVENTION

Statement of the Technical Field

The inventive arrangements relate to identification systems, and more particularly to biometric identification processing systems which are both distributed and scalable.

Description of the Related Art

The related art concerns IP cameras, biometric processing gateways, access control systems and cloud computing based services which offer biometrics identification as a service. Biometrics systems perform identification of people based on one or more modalities such as fingerprint, iris, face, palm or body vein pattern, gait, and so on. The task related to biometrics identification is computationally intensive. Certain modalities such as finger print require relatively lower computation power and the identification task can be implemented at the edge node (close to the origin of biometrics data). Certain other modalities such as face, gait, and body vein (which are based on video capture) involve considerable data bandwidth. These modalities also require higher computation power for processing and identification. Such levels of computation power are typically not provisioned in the camera or capture devices but are instead performed in a remote computer or a cloud-based server. In the case of face recognition, a compressed video stream from the camera is transmitted to the server. The server decodes the compressed video frames, detects and extracts the faces and performs face recognition. Such an arrangement requires transmission of continuous video stream from the camera to the cloud-based server and therefore necessitates a relatively high network bandwidth.

Accuracy of biometrics identification, especially in a scenario involving face recognition, depends on the illumination conditions. The physical installation setup and lighting conditions have a significant impact on accuracy of identification rates. The uneven lighting can cause shadows on the face of the persons as they walk towards the camera. Accordingly, the installation process of a face recognition system in different deployment conditions can be a challenging task.

SUMMARY OF THE INVENTION

The invention concerns a system and methods for implementing a distributed processing system for biometrics identification. A plurality of biometrics capture devices are disposed at a plurality of biometric capture locations and connected to at least a first computer data network. One or more servers provide cloud based processing services remote from the biometric capture devices. The one or more servers are arranged to process biometric feed data from the biometric capture devices and are connected to a second computer data network. One or more gateway computers are connected to the first and second computer data networks. The one or more gateway computers regulate data traffic between the one or more servers and the biometric capture devices. The plurality of biometric capture devices, the at least one gateway, and the at least one server are cooperatively arranged to perform processing operations and communications operations to execute a biometric recognition process. In such process, an individual person is recognized based on the biometric data captured by the biometric capture devices. The components of the distributed processing system including the at least one gateway and the plurality of biometric capture devices are each responsive to a plurality of processing requests. These processing requests dynamically and selectively specify constituent steps in a biometric recognition process which are to be performed by each of the components so as to carry out the biometric recognition process.

The constituent steps included in a biometric recognition process as described herein include a plurality bandwidth reducing or limiting steps. These steps are performed in the biometric capture devices to reduce the amount of data communicated in at least one of the first and second computer networks. According to one aspect, the plurality of bandwidth limiting or reducing steps performed in the biometric capture devices are selected from the group consisting of face detection, face cropping, prioritization, and face tracking.

According to another aspect, the processing requests which are directed to the plurality of biometric capture devices and/or gateway are coordinated by a processing optimizer module. This processing optimizer module is advantageously disposed in one of the gateways associated with a network neighborhood. The processing requests directed to each of components are determined by the processing optimizer module in accordance with the capabilities of the components and the processing requirements for the core functions of the components. Accordingly, the execution of the constituent steps of each biometric recognition process instance can be adaptively varied by the processing optimizer module among the components available in a network neighborhood based on information concerning the processing load of the various components.

The processing optimizer module applies a set of assigned rules to determine an optimal selection of the component in the network neighborhood for execution of the constituent steps described herein. The biometric capture devices periodically update the processing optimizer module with information concerning their processing resource availability or load. The optimal selection is determined based on a log which is dynamically maintained by the processing optimizer module. The log may include information concerning processing requests assigned to each of the available components in the network neighborhood. According to a further aspect of the inventive arrangements, the set of assigned rules is dynamically controlled by the server based on at least one machine learning algorithm. According to a further aspect, the performance of the biometric recognition process executed by the system is optimized at the server by adaptive adjustment of threshold values applied when analyzing biometric data that has been captured.

According to a further aspect, the plurality of biometric capture devices are each configured to selectively process and/or communicate captured biometric data to limit unnecessary processing and data communications to the gateway when biometric recognition of an entity associated with the biometric data has already been established to a predetermined level of confidence. In this regard, the biometric capture devices can receive feedback from at least one of the gateway and the server to determine when recognition of an entity associated with the biometric data has been established to the predetermined level of confidence.

Also, the gateway and/or the plurality of biometric capture devices can perform one or more processing functions to determine biometric data to be communicated over the network. The processing functions can be selected from the group consisting of data quality assessment, data redundancy assessment, data defect assessment, and data relevance assessment. One or more of these processing functions can involve an assessment relative to at least one threshold value which is dynamically determined in accordance with a machine learning algorithm. In some scenarios, the at least one gateway and the biometric capture devices advantageously receive feedback from the at least one server to determine whether the biometric data should be communicated.

According to yet another aspect, at least one of the gateway and the plurality of biometric capture devices can perform at least one processing step to dynamically determine a priority of biometric data to be communicated. The prioritization of such data is based on at least one factor selected from the group consisting of data quality, data redundancy, data defect and data relevance. Also, the at least one factor can be evaluated in accordance with a dynamic threshold which is established or determined in accordance with a machine learning algorithm.

The inventive arrangements will utilize a database containing biometric data to facilitate the biometric recognition process. According to a further aspect of the invention, the database can be indexed based on a plurality of gross level categories which are associated with the biometric data. The gateway and the plurality of biometric capture devices can extract metadata from the biometric data which has been collected, and the metadata will contain information indicating one or more of the plurality of gross level categories applicable to the biometric data that has been collected. Thereafter, the server advantageously uses the gross level category information specified in the metadata to expedite a comparison of the biometric data which has been collected to the biometric data stored in the database.

As will be understood from the following more detailed discussion, one or more of the components described herein will operate according to a set of assigned rules which are adaptively determined by the at least one server based on at least one machine learning algorithm. A further aspect of the invention involves the machine learning algorithm using multi-modal biometrics or other non-biometric factors to create a database that is used for fine tuning the set of assigned rules. These and other features of the invention are described in further detail below.

BRIEF DESCRIPTION OF THE DRAWINGS

Embodiments will be described with reference to the following drawing figures, in which like numerals represent like items throughout the figures, and in which:

FIG. 3 is a flowchart that is useful for understanding how biometric tracking can be used advantageously in a distributed biometric recognition system.

DETAILED DESCRIPTION

Figure 1:
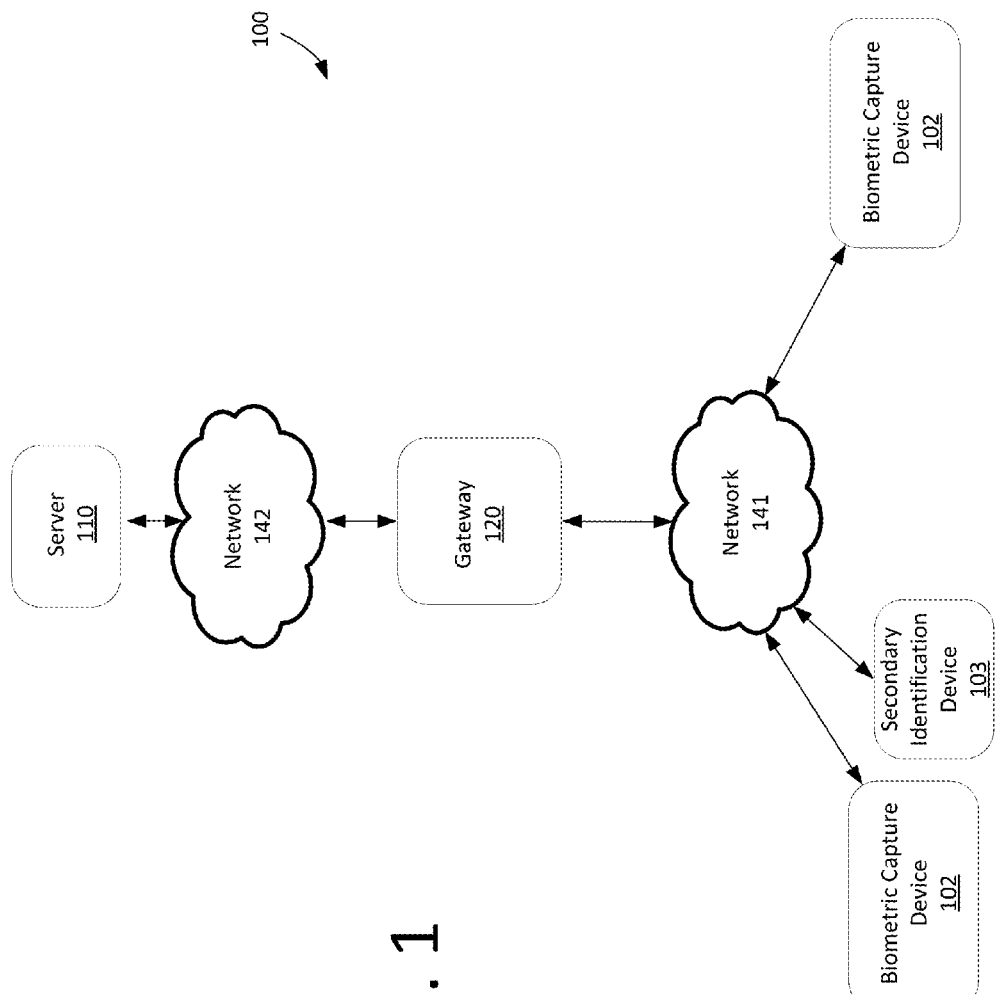
FIG. 1 is a block diagram of a computer system that is useful for understanding the invention.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. However, the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

The invention disclosed herein is related to IP cameras, biometric processing gateways, access control systems and cloud computing based services which offer biometrics identification as a service. Biometrics systems perform identification of people based on one or more modalities such as fingerprint, iris, face, palm or body vein pattern, gait etc.

The task related to biometrics identification is computationally intensive. Certain modalities such as finger print require relatively lower computation power and the identification task can be implemented at the edge node (close to the origin of biometrics data). Certain other modalities such as face, gait, and body vein (which are based on video capture) require considerable data bandwidth and higher computation power for processing and identification. Such a computation power is typically not provisioned in the camera or capture devices but will be typically provisioned at a remote computer or a cloud-based server. In the case of face recognition, a conventional system may send a compressed video stream from the camera to the server. The server will decode the compressed video frames, detect and extract the faces, and perform processing steps associated with face recognition. Transmission of continuous video stream from the camera to the cloud-based server requires relatively high network bandwidth.

Certain aspects of the invention disclosed herein concern techniques which reduce the network bandwidth requirements for biometric identification. Other aspects concern a scalable and distributed biometric system which is tailored for distributed biometric data collection, processing and recognition. Performance is improved by performing certain processing steps at processing locations closer to the edge of the network to minimize the amount of biometric data which is being communicated back to a centralized biometric recognition server or servers located in the cloud.

A further advantage is realized by applying machine learning techniques which allow the entire system to function in a way that is highly adaptive. Machine learning techniques are well known in the art and therefore will not be described here in detail. However, it should be understood that a rule learning system can be applied to analyze the metadata generated at various processing nodes and to learn a set of rules which in turn can be deployed at various processing nodes.

Certain metadata parameters are advantageously used for machine learning purposes described herein. Such parameters include face location coordinates, face size, inter pupillary distance, face pose/orientation, time stamp, speed of motion, image quality metrics (brightness, contrast, blur levels), description of face expression anomalies (eyes closed, non-neutral expression) and face matching/identification scores. The metadata associated with the parameters can be progressively computed and enriched as the captured biometric data moves from the biometric capture devices towards the cloud-based server. The rule learning system as described herein can be implemented at least in part on the cloud-based server. The data patterns or anomalies on a per camera basis may be learned by the server and a set of rules can be used to optimally tune the performance of the system. The set of rules can involve an optimal selection of face images in order to reduce the network traffic, reduce search latencies in face database, and so on.

These adaptive behaviors extend not only to the analysis of the biometric data, but also to the processing node where such analysis is performed. The optimization uses logged processing request details as input and computes optimal processing device recommendations for each type of processing steps and for a given data size to optimize for either time of processing or network load. Further, traffic patterns are identified for each of the devices in a network neighborhood and corresponding processing loads based on time-of-day or day-of-week are identified. This pattern information is used to further adjust processing device recommendations to leverage less used devices at a given time. Accordingly, the system can adaptively change the execution of a biometric recognition request and its parts (steps) across all available devices in a neighborhood based on the current load on each of the devices in the neighborhood.

Exemplary Distributed Scalable Architecture

Figure 2:
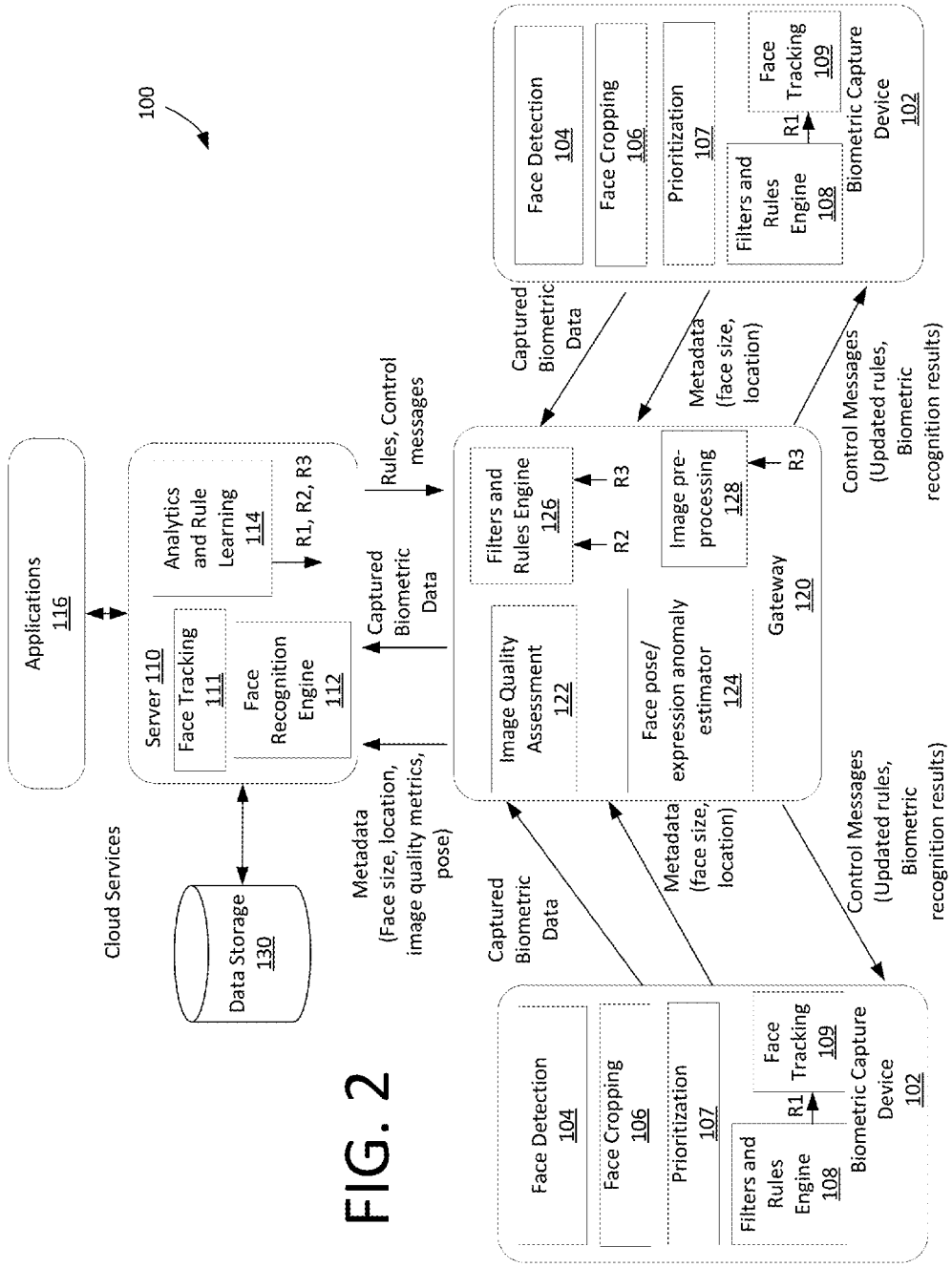
FIG. 2 is a block diagram showing additional detail and messaging communicated in the computer system of FIG. 1.

An example of various components and functions involved in a distributed biometric recognition processing system 100 as illustrated in FIGS. 1 and 2. The exemplary system is a face recognition type of biometric system. However, it will be appreciated that such exemplary arrangement is merely used to illustrate certain aspects of this invention. The inventive concepts disclosed herein are applicable to broad set of biometrics modalities.

The system shown in FIGS. 1 and 2 includes a plurality of biometrics capture devices 102 disposed at a plurality of biometric capture locations and connected to at least a first computer data network 141. Since the exemplary system is a face recognition type of biometric system, the biometric capture device in this scenario is an image capture devices such as an Internet Protocol (IP) camera. As is known, an IP camera is a type of digital video camera which can send and receive data via a computer network. The cameras may be based on visible light or IR or a combination of both of these. Only two biometric capture devices are shown in FIGS. 1 and 2 to avoid obscuring the invention. However, a distributed processing system as described herein could be expected to have many such biometric capture devices.

The distributed processing system also includes at least one server 110 providing cloud-based services remote from the biometric capture devices 102. The server 110 executes one or more software applications 116 to process biometric feed data from the plurality of biometric capture devices 102. The server is connected to a second computer data network 142 which may be the same or different as compared to the first computer data network 141. At least one gateway 120 is connected to the first and second data networks. The gateway regulates data traffic between the one or more servers 110 providing cloud-based services and the plurality of biometric capture devices 102. Only a single gateway is shown in FIG. 1, but a particular site may include more than one such gateway. The biometric capture devices 102, the at least one gateway 120, and the at least one server 110 are cooperatively arranged to perform processing operations and communications operations for executing a biometric recognition process, whereby an individual person is recognized based on the biometric data captured by the biometric capture devices.

Biometric capture devices 102 will generally have relatively lower computation power as compared to the gateway 120 and the server 110. For example, in a face recognition scenario in which the biometric capture devices 102 are IP cameras, such devices would not be expected to have sufficient processing capability to perform complex image processing tasks such as face recognition. But in the same scenario, they can have sufficient processing capacity to facilitate a reduction in the amount of biometric data that is communicated over the network. The gateway 120 has a relatively higher processing capacity as compared to the biometric capture devices 102. Accordingly a more complex set of biometric analysis and processing functions can be implemented in the gateway. For example, in the case of a face recognition type system as shown, these functional components could include an image quality assessment module 122, a face pose estimator and facial feature anomaly estimator module 124, and image pre-processing module 128. In some embodiments, a face detector module can also be included in the gateway for use in certain scenarios. The gateway can also implement a set of filters and rules to reduce the bandwidth requirement for communicating with server 110. For example, such filtering and rules can cause the gateway to drop certain faces from further processing, apply specific pre-processing or inserting and passing on additional metadata.

Although the gateway 120 has more processing capacity as compared to any individual biometric capture device 102, it should be understood that many of the incremental steps associated with a biometric recognition process can be adaptively performed on either the gateway or the biometric capture device as hereinafter described. Accordingly, in the face recognition example, functions such as face cropping, image quality assessment, face pose estimation, rules engine and face recognition can optionally be implemented either on a biometric capture device (camera) 102, gateway 120 or as a cloud service at server 110, depending on the required scale and latencies of the processing task. The goal is for the distributed processing architecture to progressively reduce the bandwidth requirements as the biometrics data moves towards the cloud (e.g. server 110).

The server 110 will generally have the highest level of processing capacity as compared to either the gateway and/or biometric capture devices. Accordingly, the server 110 can advantageously perform the most complex levels of biometric analysis. It is also responsible for supervising the analytics and rule learning that is applied to the operations of the gateway 120 and the biometric capture devices 102.

In the exemplary scenario described herein involving facial recognition, the server can include a face recognition engine. The face recognition engine performs face recognition analysis and, as such, has access to a data storage device 130. The server 110 can also include an analytics and rule learning module 114 for implementing one or more rules R1, R2, and R3 which optimize the distribution of biometric processing task among available processing resources. These rules can also be used to optimize the results of the biometric analysis process. The rules are disseminated to the gateway 120 and biometric capture devices 102, where they are executed by appropriate rules engines contained therein.

The control messages as shown in FIG. 1 comprises of updated rules and biometric recognition results (e.g. face recognition scores) reported by the face recognition engine. These messages serve as a feedback mechanism. The biometric capture device 102 can receive a communication about the face recognition result of every unique face submitted for face recognition. As explained below in further detail, such feedback can provide opportunities to prevent resubmitting of already recognized faces, thereby lowering the network traffic. The metadata communicated from the biometric capture device 102 to the gateway 120 can include any information useful for implementing the processes described herein. For example, it can include face size and location data. It can also include tracking information to help with identifying a particular set of face images as pertaining to a particular subject. The biometric capture device can also communicate actual captured biometric data. For example, in a face recognition system, this captured biometric data can include a set of face images which have been detected, cropped, and transmitted to the gateway by the biometric capture device.

The captured biometric data is communicated together with the metadata from the gateway to the server. The metadata generated by each biometric capture device can be enhanced with additional metadata and communicated from the gateway 120 to the server 110. For example, the enhanced data could include information extracted from the image data by the gateway such as image quality metrics and/or subject pose. Rules and control messages received at the gateway 120 from the server 110 can be utilized in the gateway and/or propagated to the biometric capture devices as appropriate. The various features and functions of a distributed biometric processing system as descried herein will now be described in further detail.

Network Bandwidth Reduction Based on Image Analysis

In a biometric processing system 100, several techniques are applied to reduce the amount of data communicated to the gateway and cloud based components of the system. In a face recognition scenario, the biometric capture devices 102 can have just enough processing capacity to detect, track and crop the face images from the captured video stream. Consequently, a reduced set of face images with associated metadata (for example face size and location) corresponding to every unique face in the field of view is sent to the gateway. Such an approach would lower the network bandwidth requirement.

The gateway 120 can include a set of image processing functions. Examples of such functions can include image quality assessment (which may involve evaluation of image quality factors such as contrast, brightness, and extent of image blur. Another such function could include a face pose estimator and facial feature anomaly detector. Such a processing module could detect the occurrence of certain deficiencies in the biometric data which render it sub-optimal for biometric analysis. For example, in the case of facial recognition, captured images in which the subject has their eyes closed or has a non-neutral expression, can be sub-optimal for facial recognition.

Accordingly, based on the results of the image analysis, the gateway 120 can advantageously implement a set of rules to selectively drop certain biometric data (face images in this example) from further processing. Alternatively, the gateway can use this information as a flag indicating a need to apply specific pre-processing or to insert and pass on additional metadata along with the captured biometric data. The additional processing which can be implemented at the gateway 120 may be the determination of skin tone (color), gender, face pose and face image sharpening or contrast enhancements. The goal here is to progressively reduce the bandwidth requirements as the biometrics data moves towards the cloud.

Network Bandwidth Reduction Based on Tracking

The biometric processing system 100 can also include a feedback mechanism from the cloud based server 110 to the gateway 120 and/or the biometric capture devices 102. In such a scenario, the biometric capture device can receive feedback data from the server and/or gateway concerning a face recognition result. In those instances where the server has recognized a particular set of biometric data (e.g. a face) with a high degree of confidence, this fact can be communicated to the biometric capture device so as to inhibit sending further information concerning that particular subject. Preventing the resubmitting of already recognized faces has the advantage of lowering the network traffic. The foregoing technique requires tracking of the particular subjects and the biometric data which is captured from them.

Tracking of captured biometric data can help in reducing bandwidth requirements and can also serve to improve overall processing efficiency. For example, face tracking involves keeping track of a detected subject face in each subsequent frame in the video after the face first appears. This can be accomplished by assigning a unique ID to the face or by any other suitable method. The unique ID can specify a location of the face within a frame or can be an arbitrary index value assigned to the subject. Each time the face is captured by the camera, it is assigned the same unique ID value (or some variation thereof) to identify the face as corresponding to the same person. Thereafter, information concerning a particular face which has been recognized by the system 100 with a high degree of confidence no longer needs to be communicated to the gateway 120 and server 110. Accordingly, bandwidth requirements for data communications between the various system components are advantageously reduced. This concept is illustrated in further detail in the flowchart of FIG. 3.

FIG. 3 illustrates an exemplary instance of network utilization optimization derived out of tracking Additionally it illustrates the mechanism of determining a final identity of a face based on previous N results through a voting and a match score aggregating mechanism. The process can involve processing steps performed at one or more of the network components including the biometric capture devices 102, the gateway 120 and the server 110. At least some of the steps described herein can be performed in tracking modules 109 and 111 residing in the biometric capture device 102 and the server 110, respectively.

The process starts at 302 and continues to 304 where each new video frame is passed through a face detector and all faces in the frame are collected as a set of faces. At 306, the set of detected faces are submitted to a face tracking module which determines at 308 whether the detected faces is a new face or a known faces. If the face is new (308: Yes), the face is submitted to the server 110 for face recognition at 310. Once all the detected new faces are processed (312: Yes), the process returns to step 304 where additional faces are detected in the next video frame.

The result from the face recognition engine 112 will be accumulated into a recognition data set which maintains the data indexed on a unique face ID. As each new face becomes known, the face tracking module maintains in a face recognition data set information concerning each unique face ID. The other details stored in the face recognition data set can include information such as a previous N recognition results for this face, final face identity, final match score and result stability indicator. The final identity and final match score are only populated when N results are available. Final identity may be decided through voting from the identity in the N results and the final match score can be any meaningful aggregate of the N match scores (mean/median etc. . . . ). The stability of the face recognition data may be a decision based on the N results and the final result.

If a face is not new (308: No) it will be marked as known face by the tracking module and the process will continue to 314. At step 314, the corresponding face details are retrieved from the recognition dataset. If the recognition score for the face is reasonably high and stable (314: Yes), the face image is dropped from further processing and will not be submitted for recognition. Accordingly, the tracking techniques described herein can help reduce unnecessary processing load.

If the face recognition score is not reasonably high and stable (314: No) then the process will continue to 316 where a determination is made concerning the image. Specifically, a determination is made at 316 as to whether the face image is derived from an area or region within a camera field of view that has sub-optimal lighting or has some other characteristic that makes it less than ideal for face recognition processing. For example, such a scenario may occur where a portion of the camera field of view has very low lighting.

Figures 4, 5:
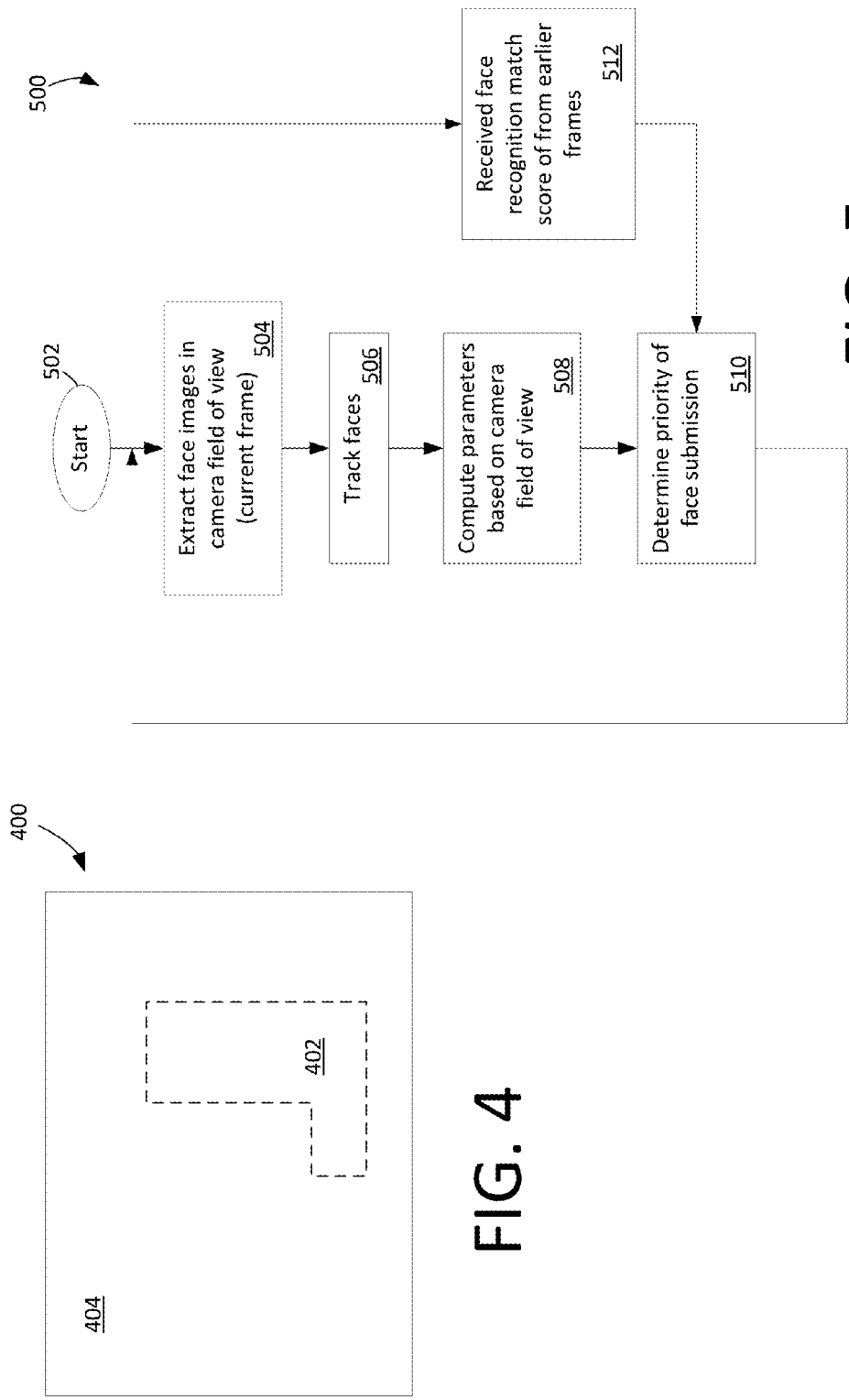
FIG. 4 is a drawing that is useful for understanding how certain portions of a camera field of view can be identified as having sub-optimal biometric capture data.
FIG. 5 is a flowchart that is useful for understanding how a biometric capture device can use feedback information and other computed parameters to determine submission or communication priority of captured biometric data.

As an example, FIG. 4 shows a field of view 400 of an IP camera used as a biometric capture device 102. When a face image is from a low illumination region 402 in the camera scene, the image suitability for biometric identification purposes can be poor. Accordingly, such images can optionally be automatically dropped from further processing at step 316. The processing system at the biometric capture device will apply the filters and rules engine 108 to identify low illumination regions (e.g. low illumination region 402) in the camera scene or field of view 400. The details of that low-illumination region can be communicated to the tracking module (e.g. tracking module 111 at server 110). Consequently, when a face image is captured, the metadata provided with such image can include the location within the camera field of view where the image was captured. When the tracking module 111 determines at 316 that a specific face image was captured in a portion of a camera field of view corresponding to a low illumination region 402, it can optionally drop that face image from further recognition processing.

The decision as to whether to drop the face image at 316 can also be based on various other factors. For example, such a decision can be based in part on an instantaneous evaluation of processor load at server 110. In this way, the server can choose not to waste time analyzing images from poor quality sources when processing demands are exceptionally high.

Notably, once the tracking module has determined at 314 that a particular face is known, it can notify the gateway 120 and/or the biometric capture device 102 (in this case the IP camera). Once notified in this manner, the gateway and/or biometric capture device can discontinue sending biometric data pertaining to the recognized face so as to reduce the bandwidth requirements of the system 100.

Bandwidth Optimization Based on Data Prioritization

In bandwidth constrained deployments, certain processing steps may be used at the biometric capture device 102 to determine the priority of captured biometric data for submission to the biometric data recognition system. For example, in a face recognition system, priority can be based on certain parameters such as proximity of the subjects to the camera, their relative speed of motion and status of face recognition. These parameters can be used to increase or decrease a priority level or value assigned to the biometric data for subsequent submission to the server or cloud-based processing services.

In an arrangement as described herein, a priority queue will be used to submit faces for face recognition. The priority queue can reside at either the biometric capture device 102 or at the gateway. Faces can be given higher (or lower) priority status for communication purposes, depending on the priority of submission assigned to them.

The foregoing concept is illustrated in the flowchart 500 shown in FIG. 5, which is useful for understanding an overall process involved in determining priority of submission in a face recognition type of biometric recognition system. The process can be performed at least in part at a biometric capture device 102, which in this scenario would be an IP camera. The process begins at 502 and continues to 504 where face images are detected and extracted from a camera field of view. These operations can be performed by a face detection module 104 and a face cropping module 106, respectively. Thereafter, tracking of the face images from each frame is facilitated in step 506 using a face tracking module 109. As noted above, tracking can involve indexing of subject faces within the camera field of view and providing suitable means for relating or associating all of the face images acquired for a particular subject appearing within a plurality of video frames for a particular camera. For example all face images extracted for a particular subject can be assigned a common index number. The index number can specify a location of the subject within the camera field of view or can specify the subject by other means. The various processing modules for face detection, cropping and tracking can be implemented in hardware, software and/or firmware within the IP camera.

In step 508 a set of prioritization parameters for each face image are computed based on camera field of view information. For example, the prioritization parameters can include parameters for proximity to the camera, location within the camera scene or field of view, or the duration of time the face has appeared within the camera field of view. In an exemplary arrangement, the priority of submission of a face image may be increased where the person is close to the camera. In such a scenario, the size of the detected face may be considered as a measure of distance of the person from the camera. The priority of submission of a face image can similarly be increased where the person is at the edge of the frame and moving out of the field of view. As a further example, the priority of submission of a face image can be increased where the recognized person is new to the scene or infrequent to the system.

Thereafter, the process proceeds to step 510, where a determination of face submission priority is made relative to other face images that are present in a priority queue. Faces with higher priority can be queued for earlier transmission to the gateway and/or server, whereas faces with lower priority can be queued for later submission. The determination of priority can be based on the prioritization parameters extracted from the biometric data in step 508. The determination at 510 is also based on a received face recognition match score of each face as determined from earlier frames in step 512. The recognition match scores can be received by a biometric capture device 102 from the server 110 as feedback based on a facial recognition analysis. Thereafter, the faces and associated metadata in the priority queue can be transmitted from the biometric capture device 102 to the gateway 120 in accordance with their priority.

It should be appreciated that the priority of submission of a previously captured face may be decreased as it is detected in subsequent frames based on information received in step 512. For example, the priority of submission of a face which is recognized with high confidence level or high match score in earlier recognition attempts, may be decreased for subsequent submission. The priority can be reduced further to zero if the face is recognized with high confidence level in 'k' out of 'n' attempts at one moment. The values of 'k' and 'n' may vary based on applications. Conversely, the priority of submission of a face image, where a person receives low confidence level or low match score in earlier attempts, may be increased for subsequent submission.

Other factors may also be used to determine priority of submission in step 510. For example, in those instances where the server has detected that a recognized person is new or infrequent to the system, the priority of submission associated with their face image may be increased. In those instances where the recognized person is a person on a known threat list, then the priority of submission may be increased.

Where a detected face image is identified as false or fake face, the priority of submission may also be reduced. Such a scenario may occur when a face detector detects a face at a location where no physical face is actually present. Such occurrences can be identified by applying certain assumptions with respect to face size and location. Face tracking and face recognition feedback may also be used to provide the necessary information for identifying such false faces in a video frame. For example, a face detector may detect a face from a portrait hanging in the background or somebody may show a photograph to the camera. An anti-spoofing mechanism may identify the fake face in such scenario and reduce the priority of such face images.

Scalable and Distributed Architecture

A further aspect of the invention involves distributing the computational parts of a biometrics application across all the neighboring devices, including biometric capture devices (such as cameras) and gateways. This will have two distinct advantages for biometric solutions—first enabling biometrics on devices that do not have a lot of processing power through leveraging the processing powers of neighboring devices and second solve a complex problem relatively closer to the edge so that the raw data corresponding to that need not be sent upstream towards cloud and hence lowering network bandwidth requirements. One embodiment of this invention may use software modules like OpenMP to leverage computing power at neighboring devices and OpenCL to leverage processing elements in a single device.

A particular advantage of the inventive arrangements described herein is that biometric recognition is broken down into constituent processing steps, which can be dynamically assigned to different devices within the network. For example, the face recognition process can be broken down into constituent steps—face detection, face image cropping, face image quality assessment, face image pre-processing and subsequently face recognition. Where appropriate, face recognition itself is broken down to further steps—facial feature extraction, faces' feature database and face feature comparison. Subsequently, when a face recognition instance starts execution, each of these steps can be run on different devices in a network neighborhood. Choice of a particular device for a particular step is made based on the capabilities of the device and the device's own processing requirements for its core functions. The coordination of breaking down a face recognition request may be done by the requesting device or it can be done by a processing scheduler which is described below in further detail.

A set of processing modules can be provided to assist in dynamically determining current processing load at a device and publishing this information to another module. This group of modules is referred to herein as a "neighborhood processing gateway". This neighborhood processing gateway (NPG) will be consulted by any device which needs to utilize a neighborhood computing resource. The NPG is responsible for load balancing the processing assistance requests and to ensure that the minimum processing required for the device's own core modules are met. The NPG could be part of the firmware of a local gateway 120 or may comprise one of the many gateways in a site. However, it will implement sufficient intelligence to enable itself to define the neighborhood and oversee the devices in the neighborhood.

Figure 6:
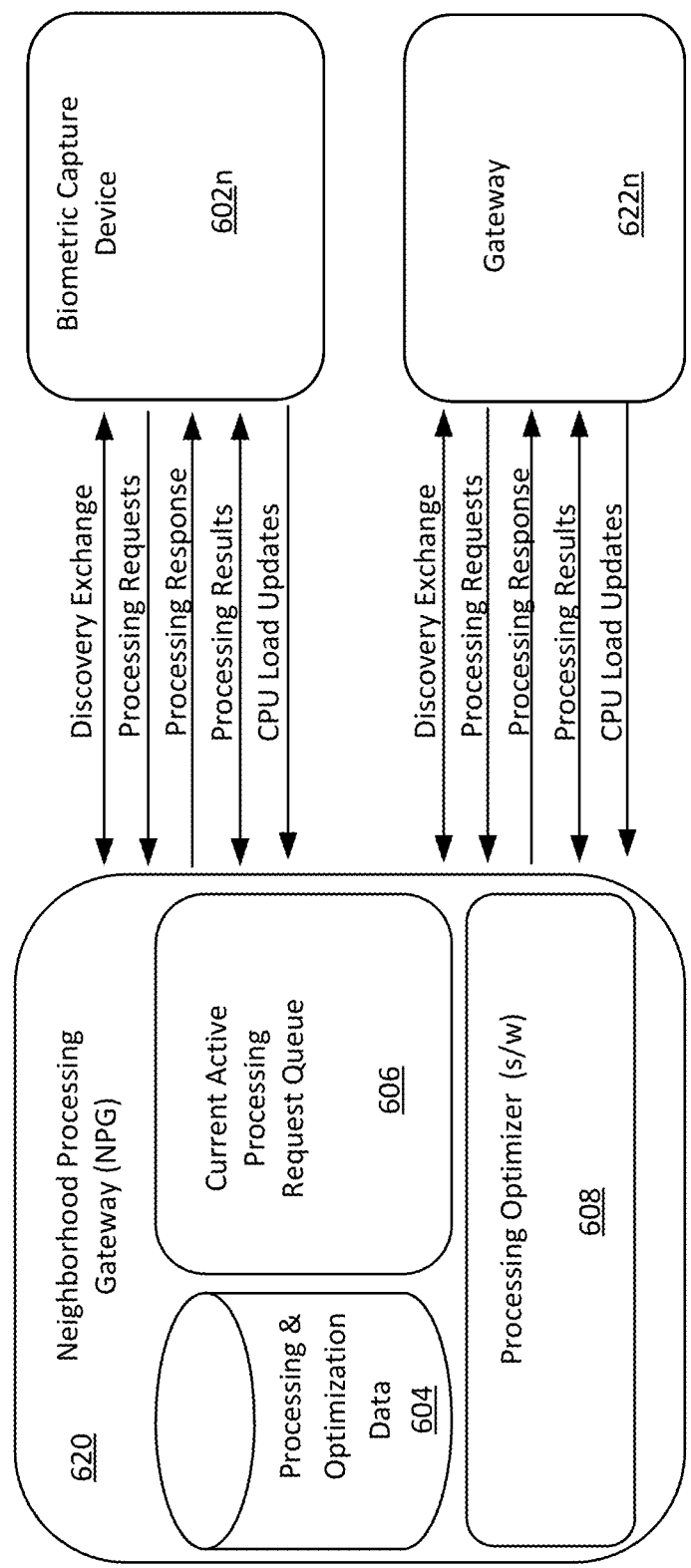
FIG. 6 is a conceptual drawing that is useful for understanding an interaction between and among a plurality of gateway computers and a plurality of biometric capture devices.

Referring now to FIG. 6, there is shown a block diagram that is useful for understanding the architecture and functions of an NPG. As noted above, the NPG could be part of the firmware of a local gateway 120 or may comprise one of many gateways which are connected in a network neighborhood. An NPG 620 will include a processing optimizer module 608, a current active processing request queue 606, and a database 604 containing processing and optimization data. The responsibilities of the NPG can include (but are not limited to): (a) creating a matrix of computing abilities of all devices in a the neighborhood in terms of types of processing assistance each device can offer, (b) maintaining the current processing load on all the devices in the neighborhood, (c) providing an API through which devices can request processing assistance, and (d) choosing a device for a processing request without disturbing the core requirements of the target device.

As shown in FIG. 6, the NPG communicates with a plurality of biometric capture devices represented by biometric capture device 602n FIG. 6. In a face recognition type system, these devices would be video cameras (e.g. IP video cameras). The NPG can also communicate with other gateway devices 622n, which may be similar to gateway 120. Communications between the NPG, the gateways and biometric capture devices can include discovery exchange messages, processing requests, processing responses, processing results, and CPU load updates. Discovery exchange messages are discussed in further detail below, but can aid in allowing network components to discover each other's presence on the network. Processing request messages are requests for performance of certain biometric recognition processing functions. Processing responses are communications which acknowledge requests and/or specify how processing requests will be handled by the network processing components. Processing results are the results of the processing activities performed by other network processing components pursuant to processing requests. CPU load updates are information provided by processing components concerning their current processing load.

The processing optimizer 608 is responsible over a period of time for learning and determining the best system processing element or device among a set of neighborhood devices for carrying out each particular type of processing. The processing optimizer can be implemented as a rules engine which will track many parameters with respect to each processing assistance request and learn the optimal choice of device for that type of request. According to one aspect, the responsibilities of the processing optimizer 608 can include (a) determining the core processing requirements of all the devices in the neighborhood, (b) collating a list of all possible processing assistance requests that are generated in the neighborhood, (c) over a period of time, creating a table with type of processing assistance, data or image size associated with this request, corresponding processing load, and corresponding processing time taken for each device, and (d) dynamically determining the best device for a new processing assistance request without compromising the core functions of the device and minimizing the processing time required. In some scenarios, the processing optimizer 608 can optimize for lowest network load. In such cases, a device wanting processing assistance will pass a set of data and ask for a set of processing types to be executed on it. The optimizer will then identify a set of devices which can accomplish this with least amount of data transfer happening on the network.

The optimized device recommendation can be computed by the processing optimizer 608 as an output of a rules learning engine which uses processing request details. Additionally, the rules learning module may tune the optimized recommendations by periodically referring to the latest processing request details data. Another aspect of optimization may be time of day based or day of the week based. For instance, it may be observed over a period of time that in an installation, there are no people in certain areas in certain times of the day. For devices in such low traffic areas, the core processing requirement during those times of day will be marked considerably lower. Hence they will be able to pick up processing requests from other busier devices. Similar patterns may be observer for days of week and so on.

As an example of the processing performed by the processing optimizer, consider a scenario in which a network neighborhood includes three cameras and one gateway. A minimum core processing requirement of each camera, as a percentage of their processing abilities is respectively defined as P1, P2, and P3. Similarly, the minimum core processing requirement of the gateway is defined as P4. For an algorithm like image sharpening, the processing optimizer module may determine over a period of time that the load on three cameras and the gateway are respectively S1, S2, S3 and S4 and corresponding time of executions are t1, t2, t3 and t4. In such a scenario and based on the total number of faces detected in the system, the processing optimizer will determine the distribution of sharpening requests to minimize the overall processing delay.

Figure 7:
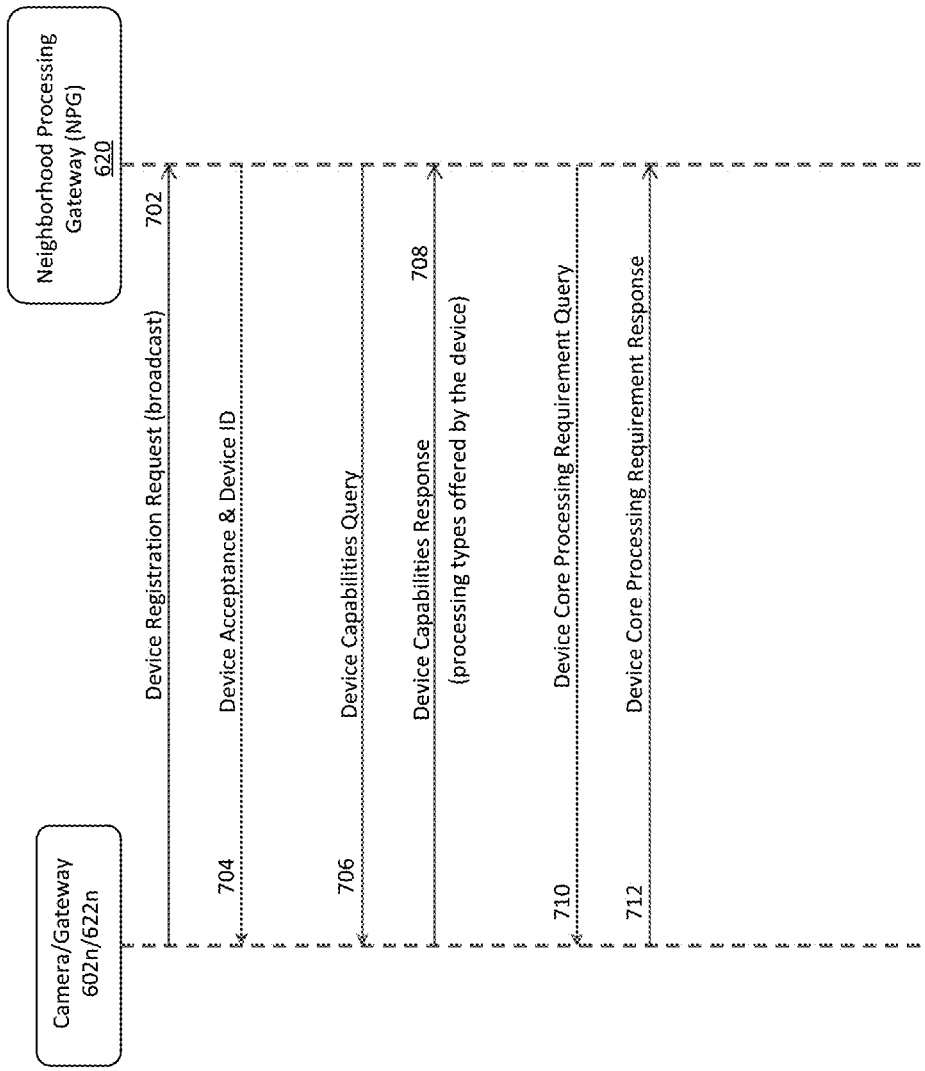
FIG. 7 is a communication flow drawing that is useful understanding a set of processing steps associated with device registration in a distributed biometric network.

In a distributed biometric recognition network as shown in FIGS. 1, 2 and 6, a registration process can be used to facilitate ad hoc addition of devices to the network. As shown in FIG. 7, any new device that is connected to the network will broadcast a device registration request 702. Any NPG 620 available in the network will respond 704 to this broadcast, indicating the acceptance of registration and providing an ID to the device. Subsequently, NPG will send a device capability query 706. In response, the device will respond 708 with details of the types of processing it can offer to the neighborhood. The device will periodically update the NPG with its current processing load, breaking down the load with respect to different types of processing and whether a processing is core (for itself) or it is being done for a neighbor. The NPG can also query devices concerning their core processing requirements at 710. The devices will over a period of time determine an estimate of their minimum core processing requirement as a percentage of total processing capability. This information can be provided to the NPG at 712.

Face Recognition Accuracy Improvements and System Optimization

Optimization of Face Template Search

A distributed biometric recognition system as described herein can further leverage the distributed processing capabilities of the network by taking advantage of gross-level analysis and processing capabilities which are closer to the network edge. According to one aspect of the invention, such an arrangement can be facilitated by organizing a biometric recognition database to utilize high level templates which can facilitate gross categorization of persons based on biometric data. If such gross level characterizations are determined at the network edge, and converted to metadata, it reduces the load upon the core processing elements in the cloud, such as server 110.

Examples of such gross level categories as referenced herein may be male and female. Also, various skin tones which differentiate darker and lighter skinned persons can be used for this purpose. Apart from such physical characteristics, as face recognition system can also use templates of multiple reference images of a person with different face poses. The face templates may be indexed according to various pose too. Examples include left pose versus right pose, front pose, or top pose versus bottom pose.

A similar mechanism for gross level indexing of face template database can be used where the camera has the capability of infrared (IR) imaging. There will be two separate broadly classified face template databases namely visible light and IR databases containing respective types of face templates. The face template database will be chosen based on the mode of the camera at the time of capturing the test face images.

Figure 8:
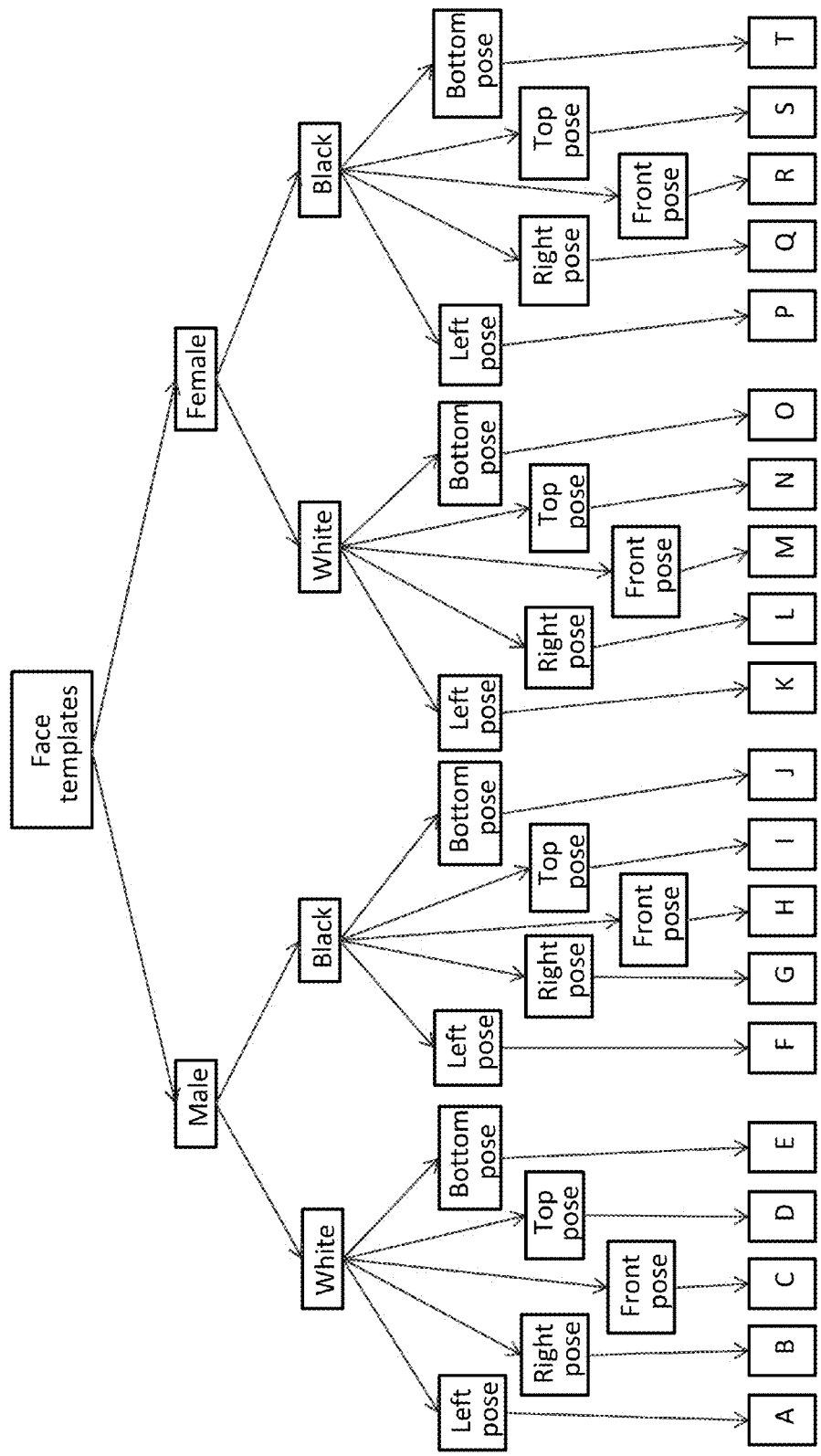
FIG. 8 is a drawing that is useful for showing how certain gross-level categories can be used in a distributed biometric recognition system to facilitate more efficient identification of subjects by using metadata.

The foregoing concept is illustrated in FIG. 8, which is a representational diagram of these gross characteristics and face poses. Such gross level indexing of the face templates will help segregating the face template database into various categories to reduce the number of templates in a specific category. As part of the image preprocessing and video analytics algorithms, the attributes associated with face information can be determined (gender, skin tone, pose, and so on) and may be specified in metadata associated with each face. Thereafter, the knowledge of these attributes can be used to prioritize and narrow down the database search function. Such an approach would reduce the latency and system performance. A specific installation scenario, characterized by available processing resources, of a face recognition system may define the order and level of indexing of a face template database.

In an example, if the gender of a person is recognized as a male, then the specific segregated database storing only male face templates may be searched, with high priority, for face matching. Apart from the gender information if the person is recognized as a white person too, then the specific segregated database storing only white male face templates may be searched for matching. If the additional information like specific pose is also determined then the segregated database may be further reduced to the templates with these particular pose templates. For example if the face pose is determined as left face pose then the specific segregated database storing only white male left face pose face templates may be searched for matching. This concept will be applicable to other gender, skin tone and face poses.

In another example, it might so happen that due to physical installation constraints people walking towards a specific camera may only produce a specific pose, for instance slightly left turned pose. For such camera a series of high face match scores from a specific gross level category, more precisely left pose indexed face templates in this case, may specify the specific database to be used by the face recognition system/analytics server. The face recognition system may learn such rule for the specific camera to prioritize face search in the specific category of face template database during operational phase. Such a learned rule may be useful either in the cloud services or on a gateway or on a camera. Further, for such a camera where the resulting face images are all of same or very similar pose (say, slight left pose), a further optimization may be done to eliminate pose estimation. This will reduce the computational load on the system. Further, pose estimation may be periodically turned on briefly to see if the installation has changed and resulted in a changed pose or a more even distribution of poses and based on the outcome adjust the enabling of pose estimation appropriately.

The reduction of processing latencies achieved using the foregoing technique may be more beneficial when the face recognition function is executed closer to the edge (at a camera or a gateway) as the available computing power would be limited.

Adaptive Adjustment of Face Recognition Match Score Threshold

The face match score of a given face recognition engine varies depending on several parameters of the test face image. Some such parameters are:
  a. Contrast and brightness of image
  b. Global characteristics of the image such as blur and sharpness
  c. Demographic characteristics of people like race, gender, age, and so.

The parameters 'a' and 'b' are functions of the physical installation conditions such as the illumination and the camera in use.

Notably, the accuracy of a face recognition engine in a given installation can be improved by adapting the recognition thresholds. A default threshold is defined based on a required trade-off between false positive identification rate (FPIR) and false negative identification rate (FNIR) for a given set of face images. However in a given installation the FPIR and FNIR may be impacted due to the variations of the parameters described above. Accordingly, an adaptive threshold mechanism can be implemented wherein the threshold configured to identify faces is increased or decreased in order to handle the variations in the above parameters. Such an adaptive mechanism could improve the face recognition accuracies.

The adaptive threshold may be learned in a supervised manner with a face dataset using input data such as contrast and brightness levels of the image, global quality measures like blur content of the image, sharpness measure, various gross level categories of people such as age, gender, skin tone etc. Machine learning techniques could then be used to compute optimal threshold recommendations based on a set of face image training data in order to achieve the required FPIR and FNIR goals.

In the case of a camera having IR capability, the adaptive threshold may be learned from both (visible light and IR) modes of images. It may so happen that the threshold recommendation may be different for each mode of images for various input data such as contrast and brightness levels of the image, global quality measures like blur content of the image, sharpness measure, various gross level categories of people such as age, gender, skin tone, and so on. The machine learning techniques may recommend different threshold for IR and visible light images.

Moreover both visible and IR mode may help each other to overcome the difficulty in matching or in case of ambiguity in face recognition. For example in case of difficulty or ambiguity in face recognition for visible light image using the recommended threshold the other mode, IR mode in this example, could be used as an additional verification step to accurately match or to overcome the ambiguity. If a camera supports fast switching between IR and visible light mode the camera may be set to the fast switching mode and the face images are tagged with metadata indicating the corresponding capture mode.

System Adaptation for Uneven Illumination Condition

A particular setup can have certain lighting conditions which may produce face images with shadows and lower brightness levels at certain areas. Generally such images produce lower face recognition confidence levels. The metadata stream for each face can consist of face size, location and image quality metrics along with the face matching scores to identify correlations and patterns which represent poorly scoring images corresponding to physical locations which can potentially have illumination problems. During the system operation, rules can be learned to drop the specific images corresponding to certain locations or apply specific image preprocessing steps to improve image quality to make the system adaptive.

This module is also responsible for determining extreme (both too high and too low) illumination conditions in a camera's field of view. It will determine regions of extreme illumination, based on the location of faces in the field of view and the size of the faces. The regions of extreme illumination may change based on time of day or seasons or may develop temporarily due to a blown lamp. For this reason the module will refresh its collection of regions with extreme illumination periodically, period update being adjusted according to a deployment's requirement. The set of regions of extreme illumination will be updates to the tracking module, which can determine potential face images with illumination induced artifacts (too dark images/over exposed images) and delete them instead of submitting them for face recognition. These faces images are dropped even without having to compute image quality assessment.

In cameras, where infrared (IR) illumination and IR image capture is supported, face images in IR mode are tagged with a metadata indicating IR as the mode of capture. Recognition system based on its performance with IR data may use either IR based template or visible light template comparison. Handling of extreme illumination conditions has to be done for the IR mode image capture as well.

Method to Identify Base Truth for Rule Learning

Figure 9A:
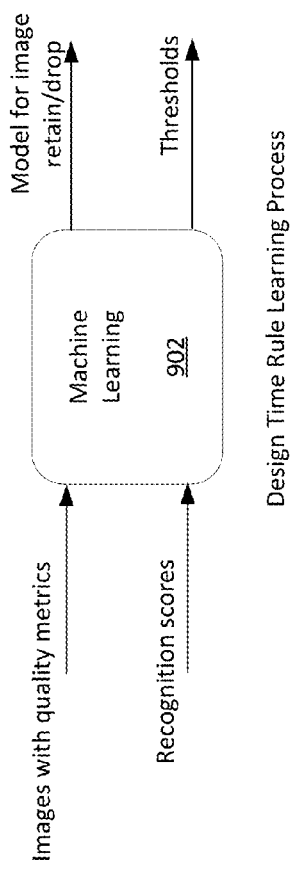
FIG. 9A is a conceptual process drawing that useful for understanding a machine learning process for a biometric recognition system which occurs at design time.

According to a further aspect, the invention concerns a method for deploying a set of rules in the rules engine 108. The rules are learned based on training data. Referring now to FIG. 9A, there is shown a conceptual diagram that is useful for understanding a rule learning process in a face recognition type of biometric system. The rule learning process in FIG. 9A occurs at design time so that a fully developed set of rules can be deployed to the rules engine 108. As illustrated in FIG. 9A, a machine learning process 902 receives a set of training data for learning purposes. The training data is comprised of face images with associated quality metrics. The training data also includes corresponding face matching or recognition scores of known people walking in front of the camera under various conditions of illumination, distances and face poses. The machine learning process 902 derives from this training data a suitable model or rule for determining when a particular image should be retained or dropped from further analysis. The machine learning process also advantageously will generate threshold values to be used when applying the rule or model. For example, one rule learned from the training data set could involve filtering out low quality face images based on threshold levels of blurriness, missing facial features, and so on. Another rule could involve dynamic adaptation of face recognition thresholds based on the image quality.

Once the face recognition system is deployed in operational phase (i.e. an actual run-time working environment), the rules learning described herein will advantageously continue. The metadata (blurriness, size, location, pose etc.) associated with the face images from various processing nodes are continuously analyzed in an analytics server. In some scenarios, the analytics server can be implemented as part of a gateway 120 or server 110. But it will be appreciated that selection of a training set for this type of operational rule learning is challenging. This is so because the machine is not able to compare the results of its recognition analysis to a set of controlled data. In other words, the basic truth concerning a particular subject's biometric identity would not be available to the machine and it therefore has no way to evaluate the performance of its recognition decisions. Human adjudication in such a scenario is not practical since the goal is for the machine to learn on its own.

The above-described problem is advantageously solved by utilizing a multifactor identification method. In a multifactor identification system the face recognition system is augmented with one or more secondary identification techniques (for instance RFID, iBeacon, WiFi, WSN, etc.). Any of these technologies can be leveraged to provide a secondary means for determining an actual identify of a person within a field of view of a biometric capture device (e.g., a camera). Such identification techniques can be implemented by any suitable means, and can involve use of one or more secondary identification devices 103.

Figure 9B:
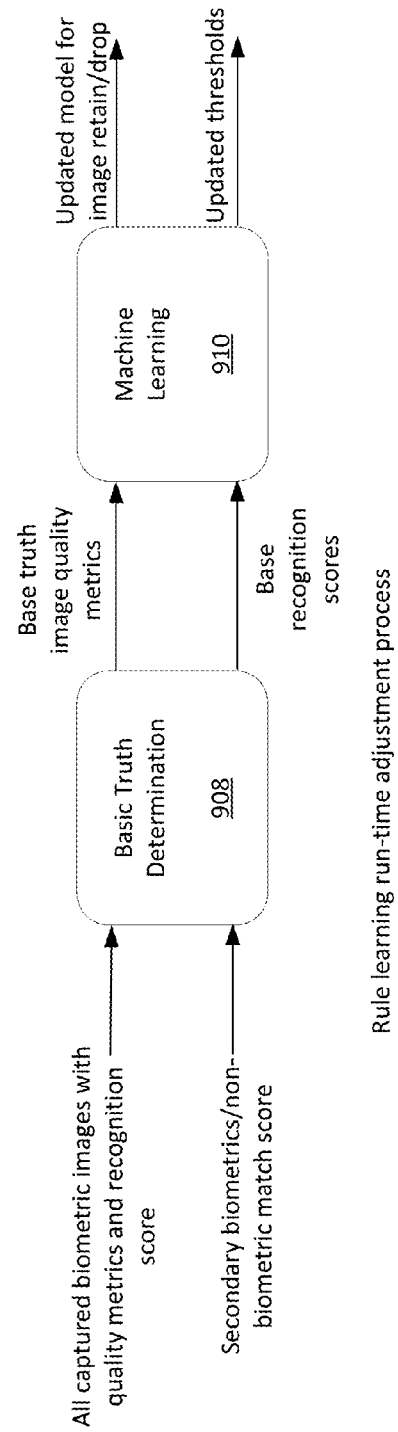
FIG. 9B is a conceptual process drawing that is useful for understanding a machine learning process for a biometric recognition system which occurs at run-time.

In a face recognition scenario, the face recognition match score is basically a comparison measure between two face templates, where one is the test face image template and the other is stored face template. When a face matching score obtained in this manner is sufficiently high and correspondingly the secondary identification technique gives a positive match, such a face image can be considered as candidates for establishing basic truth for a learning process. This process is illustrated in FIG. 9B which shows that an analytics server can perform an evaluation in a basic truth determination process 908. The inputs to such process can include all captured images collected by a set of biometric capture devices 102 (e.g. IP cameras). The inputs to such process can also include corresponding data pertaining to secondary biometrics and/or non-biometric match scores. Exemplary secondary biometric information could include information pertaining to fingerprint or iris scans. Non-biometric match scores can include secondary identification techniques that utilize RFID, iBeacon, WiFi, WSN to identify the presence of individuals within a defined space.

The inputs received by the basic truth determination process 908 are used to generate base truth image quality metrics and base recognition scores. Once generated, this data is used in a machine learning process 910 which is similar to the machine learning process 902. Accordingly, machine learning process 910 can generate updated models or rules for image retain/drop decisions. The machine learning process 910 can also generate updated evaluation thresholds to be applied when using such rules or models. This run-time adjustment process for rule learning can help accommodate optimal biometric recognition performance in various deployment scenarios and equipment installations which are different from those anticipated at design time.

Based upon the foregoing discussion it will be appreciated that the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The inventive arrangement as described herein can take the form of a computer program product on a computer-usable storage medium (for example, a hard disk or a CD-ROM). The computer-usable storage medium can have computer-usable program code embodied in the medium. The term computer program product, as used herein, refers to a device or devices comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein. The term "computer-readable medium" shall accordingly be taken to include, but not be limited to, solid-state memories such as a memory card or other package that houses one or more read-only (non-volatile) memories, random access memories, or other rewritable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A distributed processing system for biometrics identification, comprising:
   a plurality of biometrics capture devices disposed at a plurality of biometric capture locations and connected to at least a first computer data network;
   at least one server remote from the biometric capture devices which processes biometric feed data from the plurality of biometric capture devices, the at least one server connected to a second computer data network;
   at least one gateway connected to the first and second computer data networks, the at least one gateway regulating data traffic as between the at least one server and the plurality of biometric capture devices;
   the plurality of biometric capture devices, the at least one gateway, and the at least one server cooperatively arranged to perform processing operations and communications operations to execute a biometric recognition process in which an individual person is recognized based on the biometric data captured by the biometric capture devices;
   wherein components of the distributed processing system including the at least one gateway and the plurality of biometric capture devices are each responsive to a plurality of processing requests, said processing requests dynamically selectively specifying constituent steps in a biometric recognition process instance which are to be performed by each of the components for carrying out the biometric recognition process; and
   wherein the constituent steps performed by the plurality of biometric capture devices involve processing captured biometric data to (a) detect biometric features associated with at least one person and (b) reduce an amount of the captured biometric data that is to be communicated over at least the first computer data network based on the detected biometric features.

2. The distributed processing system according to claim 1, wherein the processing requests directed to the plurality of biometric capture devices are coordinated by a processing optimizer module disposed in the at least one gateway.

3. The distributed processing system according to claim 2, wherein the processing requests directed to each of said components are determined by the processing optimizer module in accordance with the capabilities of the components and the processing requirements for the core functions of the components.

4. The distributed processing system according to claim 3, wherein the execution of the constituent steps of each biometric recognition process instance are adaptively varied by the processing optimizer module among the components available in a network neighborhood based on information concerning the processing load of the components.

5. The distributed processing system according to claim 4, wherein the processing optimizer module applies a set of assigned rules to determine an optimal selection of the component in the network neighborhood for execution of the constituent steps.

6. The distributed processing system according to claim 5, wherein the set of assigned rules is dynamically controlled by the server and/or the gateway based on at least one machine learning algorithm.

7. The distributed processing system according to claim 4, wherein the plurality of biometric capture devices periodically update the processing optimizer module with information concerning processing resource availability or load.

8. The distributed processing system according to claim 1, wherein performance of the biometric recognition process is optimized at the server by adaptive adjustment of threshold values applied when analyzing biometric data that has been captured.

9. The distributed processing system according to claim 1, wherein the plurality of biometric capture devices are each configured to selectively process captured biometric data to limit data communicated to the gateway when biometric recognition of an entity associated with the biometric data has already been established to a predetermined level of confidence.

10. The distributed processing system according to claim 9, wherein the biometric capture devices receive feedback from at least one of the gateway and the server to determine when recognition of an entity associated with the biometric data has been established to the predetermined level of confidence.

11. The distributed processing system according to claim 1, wherein at least one of the gateway and the plurality of biometric capture devices perform at least one processing function for determining biometric data to be communicated, the at least one processing function selected from the group consisting of data quality assessment, data redundancy assessment, data defect assessment, and data relevance assessment.

12. The distributed processing system according to claim 11, wherein the at least one processing function involves an assessment relative to at least one threshold value or combination of multiple threshold values which is/are dynamically determined in accordance with a machine learning algorithm.

13. The method according to claim 11, wherein at least one of the gateway and the plurality of biometric capture devices receive feedback from the at least one server to determine whether the biometric data should be communicated.

14. The distributed processing system according to claim 1, wherein at least one of the gateway and the plurality of biometric capture devices performs at least one processing step to dynamically determine a priority of biometric data to be communicated.

15. The distributed processing system according to claim 14, wherein the priority is based on at least one factor selected from the group consisting of data quality, data redundancy, data defect and data relevance.

16. The distributed processing system according to claim 15, wherein the at least one factor is evaluated in accordance with a dynamic threshold determined in accordance with a machine learning algorithm.

17. The distributed processing system according to claim 1, further comprising:
- a database containing biometric data, the database indexed based on a plurality of gross level categories associated with the biometric data;
- wherein at least one of the gateway and the plurality of biometric capture devices extracts metadata from the biometric data which has been collected, the metadata containing information indicating one or more of the plurality of gross level categories applicable to the biometric data that has been collected; and
- wherein the server is responsive to the gross level categories specified in the metadata to expedite a comparison of the biometric data which has been collected to the biometric data stored in the database.

18. The distributed processing system according to claim 1, wherein one or more of the components operates according to a set of assigned rules which are adaptively determined by the at least one server based on at least one machine learning algorithm.

19. The distributed processing algorithm according to claim 18, wherein the machine learning algorithm uses multi-modal biometrics or other non-biometric factors to create an image database that is used for fine tuning the set of assigned rules.

20. A distributed processing system for biometrics identification, comprising:
- a plurality of biometrics capture devices disposed at a plurality of biometric capture locations and connected to at least a first computer data network;
- at least one server remote from the biometric capture devices which processes biometric feed data from the plurality of biometric capture devices, the at least one server connected to a second computer data network;
- at least one gateway connected to the first and second computer data networks, the at least one gateway regulating data traffic as between the at least one server and the plurality of biometric capture devices;
- the plurality of biometric capture devices, the at least one gateway, and the at least one server cooperatively arranged to perform processing operations and communications operations to execute a biometric recognition process in which an individual person is recognized based on the biometric data captured by the biometric capture devices; and
- wherein components of the distributed processing system including the at least one gateway and the plurality of biometric capture devices are each responsive to a plurality of processing requests, said processing requests dynamically selectively specifying constituent steps in a biometric recognition process instance which are to be performed by each of the components for carrying out the biometric recognition process;
- wherein the processing requests directed to the plurality of biometric capture devices are coordinated by a processing optimizer module disposed in the at least one gateway;
- wherein the processing requests directed to each of said components are determined by the processing optimizer module in accordance with the capabilities of the components and the processing requirements for the core functions of the components;
- wherein the execution of the constituent steps of each biometric recognition process instance are adaptively varied by the processing optimizer module among the components available in a network neighborhood based on information concerning the processing load of the components;
- wherein the processing optimizer module applies a set of assigned rules to determine an optimal selection of the component in the network neighborhood for execution of the constituent steps; and
- wherein the optimal selection is determined based on a log which is dynamically maintained by the processing optimizer module and specifying processing requests assigned to each of the available components in the network neighborhood.

21. A method for implementing a scalable distributed processing system for biometrics identification, comprising:
- disposing a plurality of biometric capture devices at a plurality of biometric capture locations and connecting them to at least a first computer data network;
- disposing at least one server remote from the biometric capture devices to process biometric feed data received from the plurality of biometric capture devices, and connecting the at least one server to a second computer data network;
- connecting at least one gateway to the first and second computer data networks, and using the at least one gateway to regulate data traffic as between the at least one server and the plurality of biometric capture devices;
- performing cooperative processing and communications operations involving the plurality of biometric capture devices, the at least one gateway, and the at least one server to execute a biometric recognition process in which an individual person is recognized based on the biometric data captured by the biometric capture devices; and
- communicating a plurality of processing requests from a processing optimizer module to components of the distributed processing system including the at least one gateway and the plurality of biometric capture devices, and dynamically selectively specifying which constituent steps of an instance of the biometric recognition process associated with each of the processing requests are to be performed by each of the components for carrying out the biometric recognition process;
- wherein the constituent steps performed by the plurality of biometric capture devices involve processing captured biometric data to (a) detect biometric features associated with at least one person and (b) reduce an amount of the captured biometric data that is to be communicated over at least the first computer data network based on the detected biometric features.

* * * * *